Patented Nov. 3, 1942

2,300,531

UNITED STATES PATENT OFFICE 2,300,531

REMOTE CONTROL APPARATUS

Earl M. Allen, Swissvale, Pa., assignor to The Union Switch & Signal Company, Swissvale, Pa., a corporation of Pennsylvania Application November 13, 1940, Serial No. 365,474

20 Claims. (Cl. 246—219)

My invention relates to remote control apparatus, and it has particular reference to the organization of such apparatus into remote control systems of the class utilizing a line circuit extending from an office station to a remote station for transmitting from the office to the remote station controls for controlling functions at the remote station and for transmitting from the remote to the office station indications relating to the controlled functions for indicating such functions at the office station. More particularly, my invention relates to remote control systems for railways.

Remote control systems are employed to enable a plurality of functions or devices located along a railway to be controlled from a remote central office point or station. In such systems, railway signals and track switches are two of the most common functions controlled, and it has been customary to provide each switch and each signal controlled, with a control wire extending from the office station to the function controlled, and a return wire which may be used in common in the control of two dissimilar functions such as a signal and a switch. Heretofore, a single source of current, usually located at the office station, has been utilized to supply energy for both controlling and indicating the functions controlled, and in order to separate the controls from the indications, the control of a function has been established over its own control wire and the common return, while the indication of such function has been established over the common return and the control wire of the associated dissimilar function. In the event that there exists an unbalanced number of dissimilar functions controlled, such systems of course require for each function in excess of those associated with a dissimilar function, an individual indication wire in addition to the control wire and the return wire of such function. Accordingly, a large number of additional wires utilized solely for indicating functions in excess of those associated with dissimilar functions, may be required in such systems if a large number of one type and a small number of another type of functions are to be controlled.

An object of my present invention is to provide remote control systems incorporating novel and improved means whereby the control wire of a function may be utilized to transmit both the controls and the indications of the function.

Another object is to provide remote control systems incorporating novel and improved means for controlling and indicating each function independently of other functions, thereby avoiding the necessity of utilizing additional wires to transmit only indications if an unbalanced number of dissimilar functions are controlled.

A further object is to provide remote control systems incorporating novel and improved means utilizing separate sources of current, one at the control station and the other at the remote field station, for controlling and indicating, respectively, functions located at the field station.

An additional object of my invention is to provide remote control systems incorporating novel and improved means for indicating at the office station a function at the field station in accordance with the polarity of current supplied to the indication circuit.

Another object is to provide remote control systems incorporating novel and improved means for controlling at the office station independently of the indications relating to a function itself, an approach or lock indication which indicates that the function at the field station is locked against operation.

Another object is to provide remote control systems incorporating novel and improved means for preventing storage of control of a function should an attempt be made to control the function while it is locked against operation.

Another object is to provide remote control systems incorporating novel and improved means whereby functions such as signals controlled at the office station to operate on the stick principle may be altered at the office station to operate on the non-stick principle.

Another object is to provide novel and improved remote control systems wherein all controls and indications of functions are transmitted over circuits arranged on the closed circuit principle.

Another object is the provision of novel and improved remote control systems wherein a normally energized control relay of a function is maintained energized when it is locked against operation from the control station.

Another object is to provide novel and improved remote control systems wherein the indications are arranged to indicate at the office station an operation of a function at the field station effected by means other than those controlled by the office station.

Another object is to provide novel and improved forms of remote control systems.

The above-mentioned and other important objects and characteristic features of my invention which will readily become apparent from the following description, are attained in accordance with my invention by providing two separate sources of current one located at the office station for controlling functions located at the field station, and the other source located at the field station for indicating functions at the office station. Each source is provided with a return wire which serves as a common wire for all functions at the field station, and each function is provided with an individual control wire. A transfer relay conditioned to be energized when a function at the field station assumes its operated position in response to a control from the office station, and caused to be released when control of a function is initiated at the office station, is provided to render the source at the field station effective when the transfer relay is energized, to transmit an indication to the office station over a line circuit including the control wire of the function controlled and the return wire of the field station source, and effective when the transfer relay is released, to render the source at the office station effective to transmit a control to the function over a circuit including the control wire of the function and the return wire of the office station source. Also incorporated into such systems are means for locking the functions against operation from the office station if conditions are unsafe for such operation, and for preventing storage of control of such operation if a control of a function is attempted while the function is locked against operation.

Other novel elements and features of my invention reside in the organization of apparatus into novel and improved control systems, and after describing three forms of apparatus embodying my invention, I shall specifically point out the novel features of my invention in claims.

In the accompanying drawings, wherein similar reference characters have been employed to designate corresponding parts.

Figure 1:
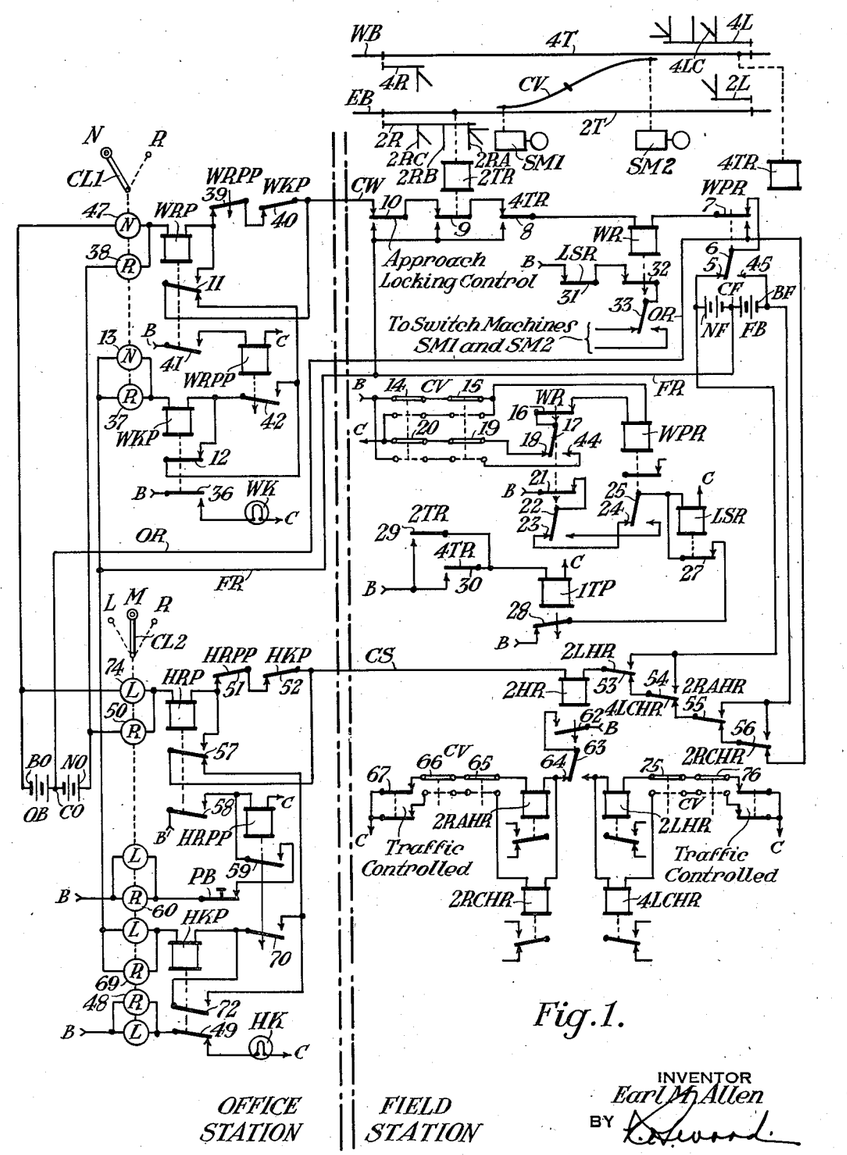
Fig. 1 is a diagrammatic view illustrating a preferred form of apparatus embodying my invention as applied to the control and indication of railway signals and track switches.

Referring now to Fig. 1, the diagram at the top represents a stretch of double track railway provided with a crossover CV to enable traffic to move between an eastbound track EB and a westbound track WB. The eastbound track EB is provided with a detector track section 2T which extends to the limits of the crossover, and similarly the westbound track WB is provided with a detector track section 4T. Each of these track sections is provided with the usual closed circuit track circuit including a normally energized track relay as indicated diagrammatically in the drawings, each track relay being designated by the reference character R with a prefix corresponding to the reference character of its associated section, the relationship of each track relay with its section being indicated by a dash line.

The two track switches of the crossover CV are preferably operated by power actuated switch machines SM1 and SM2, which machines are represented conventionally in the drawings since the particular form of such machines is immaterial. The switch machines SM1 and SM2 are preferably controlled by suitable control means, such as a switch control relay WR hereinafter referred to, the operation of the two switch machines being made dependent upon each other so that the two ends of the crossover always agree as to position.

Associated with crossover CV there is a switch repeater relay WPR, which is controlled through contacts operated by the switch machines and the switch points to indicate the position of the crossover. Relay WPR also is controlled by the switch control relay WR to function, as will be made clear presently, as a transfer relay.

In accordance with the usual practice, signals 2R and 2L are located at the opposite ends of section 2T for governing traffic in the section, signal 2R being provided with signal units 2RA, 2RB and 2RC mounted on a single mast; and signal 2L being provided with but a single unit. These signals are controlled by a single control means, such as a relay 2HR hereinafter referred to, in such manner that signal units 2RA and 2L are rendered effective to control traffic when crossover CV is in its normal position, and unit 2RC is rendered effective to control traffic when the crossover is at its reverse position and/or traffic conditions on track EB are unfavorable for the control of unit 2RA. In like fashion, signals 4L and 4R provided at the opposite ends of the section 4T are controlled by control means which has been omitted in order to simplify the drawing. Signal 4L as shown comprises a plurality of signal units including unit 4LC governing traffic over crossover CV.

The apparatus located at the field station for effecting control of crossover CV and the associated signals includes the previously mentioned switch control relay WR and signal control relay 2HR, each preferably being provided with slow releasing characteristics, and switch repeater relay WPR; as well as a field station source of current, represented as a battery FB having a positive terminal BF, a negative terminal NF and a mid or center terminal CF; a locking relay LSR controlled by switch control relay WR, switch repeater relay WPR, and a slow releasing repeater relay ITP provided for relays 2TR and 4TR, in such manner as to at times "lock out" the control of crossover CV; and a plurality of signal control relays one for each signal unit controlled by relay 2HR, the signal control relays being designated by the reference character HR with a suffix corresponding to the associated signal unit. The circuits for each signal unit are controlled by the associated signal control relay in accordance with the usual practice, these operating circuits being omitted in order to avoid unduly complicating the drawings by circuits well known and not essential to be shown for an understanding of my present invention. It is deemed sufficient to state that when a signal control relay is deenergized, its associated signal unit assumes a "stop" condition, and that when a signal control relay is energized it controls the associated signal control unit to "clear" condition. For example, signal control relay 2RAHR when deenergized causes signal unit 2RA to assume its stop condition, and such relay when energized and picked up controls signal unit 2RA to a clear condition.

The apparatus at the field station also includes the usual approach locking means indicated conventionally in the drawings by the representation of a contact bearing the legend "approach locking control," which contact represents apparatus not shown since the particular arrangement of such approach locking forms no part of my present invention and has been omitted in order to simplify the drawings.

At the office or central control station there is an office station source of current, represented as a battery OB having a positive terminal BO, a negative terminal NO and a mid or center terminal CO. In addition, two manually operable control levers are provided, one lever CL1 controlling crossover CV and the other lever CL2 controlling the signals governing traffic on track EB adjacent crossover CV, that is, signals 2R, 2L and 4L. Switch lever CL1 is capable of occupying a normal position N or a reverse position R, for controlling crossover CV to its normal or its reverse position, respectively, as will be made clear presently, and to effect such control of the crossover, the lever is provided with a plurality of contact members selectively closed in accordance with the position of the lever, each contact member bearing a reference character N or R to indicate the position of the lever at which such contact is closed. For example, contact 47 of lever CL1 bears the reference character N to indicate that this contact is closed in the normal position of the lever, while contact 38 of lever CL1 bears the reference character R to indicate that the latter contact is closed in the reverse position of the lever.

Associated with lever CL1 there is an indication relay WKP which normally is energized in a manner to be explained in detail hereinafter, when crossover CV is locked in its normal or its reverse position and the approach locking of the apparatus is inactive; an indication light WK which becomes illuminated when lever CL1 is out of correspondence with crossover CV or when the approach locking is active; an office relay WRP energized if lever CL1 is operated to a position out of correspondence with crossover CV when the approach locking is inactive; and a slow releasing repeater relay WRPP controlled over a front contact 41 of relay WRP.

Signal lever CL2 is a three-position lever normally occupying a normal or mid position M, and movable to either of two extreme control positions, a left position L or a right position R, wherein contacts controlled by the lever are selectively closed. Each contact of lever CL2 bears a reference character L or R to indicate the position of the lever in which such contact is closed, the reference character L indicating that a contact is closed only in the left position L of the lever while the reference character R indicates, in the case of lever CL2, that a contact is closed only in the right position R of the lever.

Associated with lever CL2 there is an indication relay HKP which is energized, as will be made clear presently, when lever CL2 is in either its right or left position and signal control relay 2HR occupies a corresponding position; an indication light HK illuminated only when lever CL2 is in either its right or left position and is out of correspondence with relay 2HR; an office relay HRP energized when lever CL2 is operated to a position out of correspondence with relay 2HR; a slow releasing repeater relay HRPP controlled by relay HRP; and a push button PB adapted to change the operating control of the signals from the "stick" to the "non-stick" principle.

Preferably, the office station also includes the usual "call-on" push buttons which enable the low speed signal units of signals 2R and 4L to be utilized as so-called "call-on" signals, as well as approach annunciator apparatus operative to provide audible and/or visual indications of changes of track section occupancy at the remote field station. The "call-on" push buttons with their associated control apparatus, and the approach annunciator apparatus, are not shown in order to simplify the drawings, inasmuch as the particular type of such apparatus employed forms no part of my present invention.

In order further to simplify the drawings, I have represented relay contacts at times disposed remote from the relays which cause such contacts to operate, but each of such contacts has been represented in the position which it assumes normally and has been identified by the reference character of the relay controlling such contact as well as by a reference character individual to such contact. For example, the reference character WPR has been placed immediately above contact 7 to indicate that this contact is controlled by relay WPR, and this contact is represented in its picked-up position wherein an associated front contact point is engaged, thereby indicating that relay WPR is normally energized.

Extending between the office and the field stations are two common return wires one for the office station source and the other for the field station source. Return wire OR is connected to mid terminal CO of battery OB and functions as a common return for all operating controls transmitted from the office station to the field station. Return wire FR is connected to mid terminal CF of battery FB and functions as a common return for all indicating controls transmitted from the field station to the office station. Each function at the field station also is provided with a control wire which extends from the office station to the field station. As shown in the drawings, crossover CV is provided with a control wire CW and the signal control relay 2HR is provided with a control wire CS.

The apparatus illustrated in Fig. 1 is in its normal condition, as represented in the drawings, when crossover CV is in its normal position, sections 2T and 4T are unoccupied and the approach locking is inactive as indicated by the representation of front contact 10 as being closed, and levers CL1 and CL2 are in their normal positions. In this condition of the apparatus, that is, with crossover CV in its normal position and switch lever CL1 in its corresponding normal position N, switch indicating relay WKP is energized in series with switch control relay WR by current of what I shall term normal polarity supplied over a normal indication circuit which may be traced from terminal NF of field station battery FB through normal polar contact 5—6 and front contact 7 of relay WPR, the winding of relay WR, front contact 8 of relay 4TR, front contact 9 of relay 2TR, contact 10 operated by the approach locking control, control wire CW, back contact 11 of relay WRP, front contact 12 and the winding of relay WKP, contact 13 of lever CL1, and return wire FR to mid terminal CF of battery FB. Relay WR operates its polar contact members to their normal or left-hand positions, as viewed in Fig. 1, in response to current of normal polarity received over the circuit just traced.

With relay WR energized in its normal direction to operate its polar contact member 17 to a position of correspondence with crossover CV as indicated by contact members 14, 15, 19 and 20 operated by the crossover, relay WPR is likewise energized in its normal direction to close its front contact 7 and its normal polar contact 5—6 in response to current supplied over a circuit passing from terminal B of a suitable source of current, such as a battery not shown, through contacts 14 and 15 operated by crossover CV and the associated switch mechanisms and closed only when crossover CV is locked in its normal position, the winding of relay WPR, front contact 16 and normal polar contact 17—18 of relay WR, contacts 19 and 20 controlled by crossover CV and the associated switch mechanisms, to terminal C of the source of current. It follows that relay WPR is energized to close its front contact 7 and its normal polar contact 5—6 and thus complete the previously traced circuit of relays WR and WKP only if relay WR is picked up to close in turn its front contact 16, and polar contact member 17 of relay WR corresponds in position to the position of crossover CV as indicated by contacts 14, 15, 19 and 20.

In the normal condition of the apparatus, locking relay LSR also is energized over a circuit passing from terminal B through front contact 21 and normal polar contact 22—23 of relay WR, normal polar contact 24—25 of relay WPR and the winding of relay LSR to terminal C, this circuit obviously being completed only when relay WR is picked up and the polar contact members of relays WR and WPR are in corresponding relative positions. With relay LSR picked up, its front contact 27 completes an obvious stick circuit path which functions in the event that the first traced circuit of relay LSR becomes opened, to hold such relay energized until back contact 28 of relay ITP opens due to the energization of relay ITP caused by the closing of back contact 29 of relay 2TR and/or back contact 30 of relay 4TR. With relays LSR and WR energized, the apparatus is conditioned to control crossover CV in response to a movement of lever CL1, the operating circuits for switch mechanisms SM1 and SM2 being represented in the drawings as including front contact 31 of relay LSR, front contact 32 and polar contact member 33 of relay WR, the remainder of the circuit connection to the switch machines being omitted in order to simplify the drawings.

As shown in Fig. 1, relays WRP and WRPP associated with lever CL1; relays HRP, HRPP and HKP associated with lever CL2; relay 2HR and the signal control relays 2RAHR, 2RCHR, 2LHR and 4LCHR are all deenergized. All of the signals are in the normal "stop" position, and indicators WK and HK are both dark to indicate correspondence between crossover CV and lever CL1, and the signals at the remote station and lever CL2, respectively.

*Switch control*

With the apparatus of Fig. 1 in its normal condition, as represented in the drawings, that is, with lever CL1 and crossover CV in corresponding normal positions, sections 2T and 4T unoccupied, and the approach locking inactive, the crossover may be operated to its reverse position by moving lever CL1 from its normal position N into its reverse position R. During the travel of the lever from its one extreme control position to the other, lever contact 13 becomes opened to open the previously traced normal indication circuit over which relays WKP and WR are held normally energized, and relay WKP immediately releases to close its back contact 36 and thus complete an obvious energizing circuit for switch indication lamp WK, which lamp becomes illuminated to show that lever CL1 and crossover CV are out of agreement. Relay WKP also opens its front stick contact 12, thereby opening the normal indication circuit at that point prior to lever contact 37 closing when the lever reaches its reverse position R. Relay WR accordingly becomes deenergized and drops at the end of its slow release period to open its front contact 16 and thus deenergize relay WPR, which latter relay in turn releases to open its front and close its back contact 7 to transfer relay WR from the field battery FB to the office station battery OB, whereupon relay WR becomes energized in series with office relay WRP over a reverse operating circuit which may be traced from terminal NO of battery OB through contact 38 of lever CL1, the winding of relay WRP, back contact 39 of relay WRPP, back contact 40 of relay WKP, control wire CW, contact 10 operated by the approach locking control, front contacts 9 and 8 of detector track relays 2TR and 4TR, respectively, the winding of relay WR, back contact 7 of relay WPR and return wire OR to terminal CO of battery OB. The current supplied from battery OB to relay WR over the just traced reverse operating circuit is opposite in polarity to the current supplied from field battery FB to the normally closed indication circuit previously traced. Office relay WRP first picks up in response to current supplied from battery OB to close its front contact 11 and thus complete a stick circuit path around back contacts 39 and 40 of relays WRPP and WKP, respectively, which stick circuit path holds relays WRP and WR energized after repeater relay WRPP picks up over front contact 41 of relay WRP to open back contact 39 of relay WRPP interposed in the operating circuit just traced. Relay WRPP in picking up also closes its front contact 42 to condition relay WKP to be energized, as will appear later.

The energization of relay WR by current opposite in polarity to that supplied over its normal indication circuit, causes its polar contact members to be operated to their reverse or right-hand positions, as viewed in Fig. 1, and its front contacts to be closed. Inasmuch as locking relay LSR is now held energized over a stick circuit including back contact 28 of track repeater relay ITP, front contact 31 of relay LSR is closed so that the reversal of the polar contact member 33 of relay WR conditions the operating circuit of switch mechanisms SM1 and SM2 to operate crossover CV to its reverse position. The movement of crossover CV intermediate its normal and reverse positions of course opens all of its associated contact members, such as members 14, 15, 19 and 20 interposed in the control circuit of relay WPR, but when the crossover reaches its reverse position, members 14, 15, 19 and 20 are operated by the crossover to their respective reverse positions, and relay WPR accordingly becomes energized over a reverse circuit including members 14, 15, 19 and 20 of crossover CV closed in their reverse positions, and front contact 16 and reverse polar contact 44—17 of relay WR. The polarity of current energizing relay WPR is now the reverse of that which energized the relay in the normal condition of the apparatus, so that relay WPR reverses its polar contact members and then picks up to indicate that crossover CV and control relay WR are in corresponding relative positions. The energization of relay WPR also transfers control relay WR from the office station source to the field station source, by opening the previously traced reverse operating circuit of relays WRP and WR at back contact 7 of relay WPR, whereupon relay WRP immediately releases to close its back contact 11 and complete for indication relay WKP and control relay WR a reverse indication circuit extending from terminal CF of field station battery FB through return wire FR, contact 37 of lever CL1, the winding of relay WKP, front contact 42 of relay WRPP (held closed during the slow release interval of that relay), back contact 11 of relay WRP, control wire CW, contact 10 operated by the approach locking control, front contacts 9 and 8 of relays 2TR and 4TR, respectively, the winding of relay WR, front contact 7 and reverse polar contact 6—45 of relay WPR to terminal BF of battery FB. The slow releasing characteristics of relay WR retain that relay in its picked-up position during the interval that such relay is being transferred from the office station to the field station source, and since the current supplied from battery FB to relay WR over the previously traced reverse indication circuit is of the same relative polarity as the current supplied from battery OB to relay WR over the previously traced reverse operating circuit, relay WR remains picked up in response to current received from the field station source, and relay WKP picks up to close its front contact 12 and thereby complete its stick circuit path around front contact 42 of relay WRPP, which latter contact opens at the end of the slow release interval of relay WRPP. The energization of relay WKP also causes its back contact 36 to open and thus deenergize indication lamp WK, which accordingly becomes dark to indicate that crossover CV and lever CL1 are in corresponding relative positions.

It is believed that the manner in which the apparatus functions to control crossover CV from its reverse to its normal position in response to a movement of switch lever CL1 from its reverse position R to its normal position N, will be readily apparent from an inspection of the drawing and the foregoing detailed description of the operation of the apparatus for controlling crossover CV from its normal to its reverse position, and further detailed explanation of the operation of the apparatus in response to a movement of lever CL1 from its reverse R to its normal N position is believed to be unnecessary.

From the foregoing, it is readily apparent that relays WKP and WR are held energized after the crossover CV at the field station has responded to a control from the office station, over an indication circuit which includes a front contact of relay WKP, so that once this circuit is interrupted it can be completed again only after relay WKP is picked up over its pick-up circuit which includes a front contact 42 of relay WRPP and a back contact 11 of relay WRP. It follows, therefore, that relays WRP and WRPP must first be energized, and then that relay WRP be subsequently deenergized, in order to establish the pick-up circuit of relay WKP; or in other words that an operating circuit of relay WR must first be completed and then interrupted before the pick-up circuit of relay WKP can be completed.

It is also apparent that if, with the apparatus in its normal condition as shown, or with crossover CV in its reverse position and relays WR and WKP held energized over their previously traced reverse indication circuit, crossover CV "creeps" or is caused to move by means other than by switch machines SM1 and SM2, relay WPR will become released to open its front contact 7 and thus interrupt the indication circuit holding relays WR and WKP energized. Relay WKP thereupon will release and close its back contact 36 to illuminate lamp WK and thus indicate that crossover CV has moved in the field and no longer is in a position of correspondence with lever CL1.

*Switch storage prevention*

In the event that switch lever CL1 is moved by the operator during the interval that the approach locking is active and conditions are unsafe to permit an operation of crossover CV to take place, the apparatus embodying my invention incorporates means for preventing storage of the switch control when conditions again become safe for operation of crossover CV. Assume that with the apparatus in its normal condition as represented in Fig. 1, the approach locking becomes active and contact 10 controlled thereby opens. Under such assumed conditions, relay WKP releases to close its back contact 36 and cause indicator lamp WK to become illuminated to indicate that the approach locking is effective to prevent movement of crossover CV, while relay WR is retained energized over an obvious circuit which extends from terminal NF of battery FB through normal polar contact 5—6 and front contact 7 of relay WPR, the winding of relay WR, front contacts 8 and 9 of relays 4TR and 2TR, respectively, and back contact 10 controlled by the approach locking to terminal CF of battery FB. It is to be noted that relay WR is held energized over alternate paths provided in the just traced circuit in the event of the occupancy of either or both sections 2T and 4T, since such circuit may be completed through back contact 9 of relay 2TR or back contact 8 of relay 4TR, as is readily apparent from an inspection of the drawings. If, now, with detector locking back contact 8 or 9, or approach locking back contact 10 closed to hold relay WR energized, lever CL1 is operated from its normal position N to its reverse position R in an attempt to initiate operation of the crossover, the movement of the lever at this time will have no effect upon the apparatus, since the approach and/or detector locking being active prevents the previously traced reverse operating circuit of relays WRP and WR from being established.

When detector track section 2T and/or 4T becomes occupied, relay 1TP is caused to pick up, thereby opening the stick circuit of switch locking relay LSR. After the approach and detector locking becomes inactive, relay WR becomes energized in series with office relay WRP over its previously traced reverse operating circuit, but the polarity of energization of this circuit is the reverse of that supplied to relay WR when the detector and/or approach locking is active, hence relay WR is immediately caused to release to open its front contacts 16 and 21 interposed respectively in the energizing circuits of relays WPR and LSR, respectively. Relays WPR and LSR accordingly release, and when relay WR reverses its polar contact members and picks up in response to current received from office battery OB over its reverse operating circuit, both relays WPR and LSR remain released, the former relay remaining released since its circuit is now opened when the polar contact members of relay WR are out of correspondence with crossover CV; and the latter relay LSR remaining released since its stick circuit is open at back contact 28 of relay 1TP (due to the slow releasing characteristics of relay ITP delaying the closure of its back contact 28) and its pick-up circuit is open when the polar contact members of relays WR and WPR are out of correspondence. It follows, therefore, that although control relay WR assumes a position of correspondence with the switch control lever after the detector and/or approach locking becomes inactive, operation of the crossover CV is not effected since the operating circuits of switch mechanisms SM1 and SM2 are open at front contact 31 of switch locking relay LSR.

Office relay WRP remains energized and indication relay WKP remains deenergized under the above assumed conditions, that is, with lever CL1 out of correspondence with crossover CV and operation of the crossover "locked out" by the deenergization of relay LSR, since relay WPR remains released under such conditions and hence does not transfer relay WR from the office station source to the field station source. Indication lamp WK accordingly remains illuminated to indicate that lever CL1 and crossover CV are out of correspondence.

The operator may regain control of crossover CV by restoring lever CL1 to its position of correspondence with the crossover, thereby opening the reverse operating circuit of relays WPR and WR to cause relay WRP to release and open its front contact 11 and thus deenergize relay WRPP. Relay WRPP releases at the end of its slow release period, and closes its back contact 39 to complete for relays WR and WRP a normal operating circuit over which relay WR is energized by current supplied from battery OB and of a polarity such as to cause relay WR to shift its polar contact members back to their normal position in correspondence with crossover CV. This normal operating circuit may be traced from terminal BO of battery OB through lever contact 41, the winding of relay WRP, back contact 39 of relay WRPP, back contact 40 of relay WKP, control wire CW, contact 10 operated by the approach locking control, front contacts 9 and 8 of relays 2TR and 4TR, respectively, the winding of relay WR, back contact 7 of relay WPR and return wire OR to terminal CO of battery OB. Relay WPR now becomes energized with the polar contact members of relay WR in a position of correspondence with crossover CV, and relay WPR picks up to transfer relay WR from the office station source to the field station source by completing at front contact 7 of relay WPR the previously traced normal indication circuit of relays WKP and WR. Relay WKP thereupon picks up to control indicator WK to its dark condition. Locking relay LSR also picks up with relays WR and WPR in correspondence, and the apparatus is restored to its normal condition.

*Control of signal units*

With the apparatus of Fig. 1 in its normal condition, that is, with lever CL1 and crossover CV in corresponding normal positions, sections 2T and 4T unoccupied and the approach locking inactive, signal unit 2RA or 2L may be cleared to permit a main line move on track EB, by operating lever CL2 to its right position R or its left position L. If, for example, the operator wishes to clear signal unit 2RA and operates lever CL2 to its right position R, contact 48 of the lever closes to complete for indication lamp HK an obvious circuit extending from terminal B through contact 48 of lever CL2, back contact 49 of relay HKP and the filament of indication lamp HK to terminal C. Indication lamp HK accordingly becomes illuminated to indicate that lever CL2 is in a position out of correspondence with the signals controlled thereby. Contact 50 of lever CL2 also closes to complete for office relay HRP and signal control relay 2HR a control or operating circuit which may be traced from terminal NO of battery OB through contact 50 of lever CL2, the winding of relay HRP, back contact 51 of relay HRPP, back contact 52 of relay HKP, control wire CS, the winding of relay 2HR, back contacts 53, 54, 55 and 56 of signal control relays 2LHR, 4LCHR, 2RAHR and 2RCHR, respectively, and return wire OR to terminal CO of battery OB. Office relay HRP accordingly picks up to close its front contact 57 and complete an obvious stick circuit path which shunts around back contacts 51 and 52 of relays HRPP and HKP, respectively. This stick circuit path becomes effective to hold relays HRP and 2HR energized when repeater relay HRPP picks up over its obvious pick-up circuit including front contact 58 of relay HRP, to open its back contact 51 interposed in the just traced operating circuit of relays HRP and 2HR. Repeater relay HRPP in picking up closes its front contact 59 to complete a stick circuit path extending from terminal B through contact 60 of lever CL2, the normally closed contact of push button PB, front contact 59 of relay HRPP and the winding of relay HRPP to terminal C, this circuit being effective to hold relay HRPP energized, if its pick-up circuit becomes opened due to the opening of front contact 58 of relay HRP, until either lever CL2 is restored to its normal mid position M or push button PB is actuated to open its normally closed contact. This stick circuit of relay HRPP and the control established thereover by push button PB will be referred to hereinafter.

Signal control relay 2HR also picks up in series with office relay HRP, and closes its front contact 62. I shall assume that the polarity of current supplied from office station battery OB to relays HRP and 2HR over the previously mentioned operating circuit of these relays, is such as to cause relay 2HR to operate its polar contact member 63 to its normal or left-hand position, that is, the position in which member 63 is represented in Fig. 1. Under such assumed conditions, relay 2RAHR picks up over a circuit extending from terminal B through front contact 62 and normal polar contact 63—64 of relay 2HR, the winding of relay 2RAHR, contacts 65 and 66 operated by crossover CV and the associated switch mechanisms and closed only if crossover CV is locked in its normal position, and contact 67 controlled by traffic on track EB adjacent crossover CV, this contact representing the usual detector locking incorporated into the control of signals governing the movement of traffic on a stretch of track, to terminal C. Relay 2RAHR accordingly becomes energized and picks up to clear signal unit 2RA, and to interrupt at back contact 55 the previously traced circuit over which current from office station battery OB is supplied to relays 2HR and HRP. Relay HRP thereupon releases to open its front and close its back contact 57, thereby completing for indication relay HKP and relay 2HR a normal indication circuit extending from terminal CF of field station battery FB, return wire FR, contact 69 of lever CL2, the winding of relay HKP, front contact 70 of relay HRPP (which relay is held picked up over its previously mentioned stick circuit path), back contact 57 of relay HRP, control wire CS, the winding of relay 2HR, back contacts 53 and 54 of relays 2LHR and 4LCHR, and front contact 55 of relay 2RAHR to terminal BF of battery FB.

The energization of relay HKP over the above traced indication circuit causes its front contact 72 to close and complete a stick circuit path around front contact 70 of relay HRPP, as can be seen from an inspection of the drawings, and also opens back contact 49 to open the previously traced circuit of indicator lamp HK, whereupon the indicator lamp becomes dark to indicate that the signals at the field station are controlled to a condition of correspondence with lever CL2.

It is to be noted that when a signal control relay, such as relay 2RAHR, for example, is energized, its associated front contact is closed to thus condition indication relay HKP and signal control relay 2HR to be energized by current supplied from the field station source FB, whereas when such relay and all other signal control relays are released, office station relay HRP and control realy 2HR are conditioned to be energized by current supplied from the office station source OB. It follows, therefore, that the signal control relays function as transfer relays in that each of such relays is effective to transfer the energization of relay 2HR from one source of current to the other according as such signal control relay is released or picked up. Also, it should be noted that the current supplied from the office station source OB to relay 2HR over the previously traced operating circuit is of the same relative polarity as the current supplied from the field station source FB to relay 2HR over its previously traced normal indication circuit, hence since the slow releasing characteristics of relay 2HR hold that relay picked up during the switching or transfer of the relay from its operating to its indication circuit, relay 2HR retains its front contact 62 closed to maintain relay 2RAHR energized and thus condition relay 2HR to be energized in series with indication relay HKP over the previously mentioned normal indication circuit supplied with current from field station source FB.

When a train on track EB accepts the clear indication of signal unit 2RA and enters section 2T, traffic controlled contact 67 interposed in the previously traced energizing circuit of relay 2RAHR opens to cause that relay to release and thus control signal unit 2RA to stop. Relay 2RAHR in releasing opens its front contact 55 to open the previously traced normal indication circuit of relays HKP and 2HR, whereupon these relays in turn release. Back contact 49 of relay HKP is now closed to complete the previously traced circuit of indication lamp HK, which accordingly becomes illuminated to indicate that lever CL2 and the signals controlled thereby are out of agreement. The operator may now restore lever CL2 to its normal mid position M, thereby opening lever contact 48 to open the circuit of indication lamp HK and cause that lamp again to become dark to indicate correspondence between lever CL2 and the controlled signals.

In the event that the operator does not restore lever CL2 to normal when a train accepts signal unit 2RA and enters section 2T, the circuit functions to prevent automatic clearing of unit 2RA when the train vacates section 2T, since with relay HRPP energized over its stick circuit controlled by lever CL2 and push button PB, and with both relays HRP and HKP at the office station in their released positions, the previously traced operating circuit of relays HRP and 2HR is held open at back contact 51 of relay HRPP, hence such relays remain released and signal control relay 2RAHR also remains released so that signal unit 2RA continues to display its "stop" indication. The operator may regain control of the signals by restoring lever CL2 to its normal position, thereby opening lever contact 60 to open the stick circuit of relay HRPP and cause its back contact 51 to close and thereby condition the apparatus for control upon a further movement of lever CL2. On the other hand, the operator may alter the control of the signals from the "stick" to the "non-stick" principle by retaining the lever at its extreme operating position and then by actuating push button PB, open the circuit of relay HRPP, whereupon relay HRPP releases to close its back contact 51 and thereby complete the previously traced operating circuit of relays HRP and 2HR.

The energization of relay 2HR under the above assumed conditions causes the signal selected by the lever 2L and crossover CV to clear in substantially the same manner as that heretofore described in detail for a movement of the lever 2L from its mid position M to its right position R, after the train vacates section 2T and traffic control contact 67 closes.

It is readily apparent from an inspection of the apparatus illustrated in Fig. 1 that with such apparatus in its normal position, if lever CL2 had been operated to its left position L instead of its right position R, as above described, then terminal BO of battery OB would have been connected through contact 74 of lever 2L to the winding of relay HRP, instead of terminal NO of battery OB being connected to such relay through lever contact 56, as explained previously. Thus, if lever CL2 had been operated to its left position L, the energization of relay 2HR would have been opposite in relative polarity to that established with lever CL2 in its right position R, and relay 2HR accordingly would have operated its polar contact member 63 to its reverse or right-hand position to energize relay 2LHR over a circuit easily traced. The energization of relay 2LHR, of course, would have cleared signal 2L, and also would have transferred relay 2HR from the office station source OB to the field station source FB, thereby causing the release of office relay HRP and causing relay HKP to become energized in substantially the same manner as that pointed out in detail heretofore in connection with the clearing of signal unit 2RA.

Similarly, it is apparent from an inspection of the drawings that if crossover CV is in its reverse position when lever CL2 is operated, then its contacts 65, 66 and 75, 76 select relay 2RCHR or 4LCHR for control by relay 2HR in response to an operation of lever CL2. The circuits and the manner in which the apparatus operates upon movement of lever CL2 when crossover CV is reversed is believed to be obvious from an inspection of the drawing taken in connection with the foregoing description of the operation of the apparatus in clearing signal unit 2RA, and further detailed description is deemed unnecessary.

*Switch control (Fig. 2)*

Figure 2:
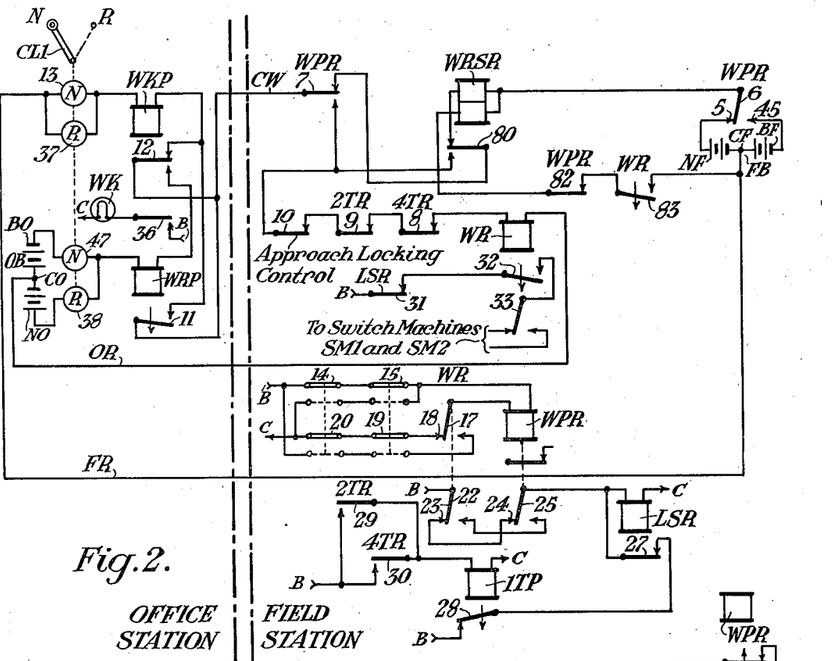
Figs. 2 and 3 are each diagrammatic views illustrating modified forms of the apparatus represented in Fig. 1, and each also embodying my invention. It is to be understood, of course, that while I have represented apparatus embodying my invention applied to the control of railway signals and track switches, the represented use of such apparatus is merely illustrative and is but an example of many uses where my invention will be useful.

In Fig. 2, I have represented a modified arrangement of the switch or crossover control apparatus illustrated in Fig. 1. The apparatus represented in Fig. 2 differs from that shown in Fig. 1 chiefly in that control relay WR of Fig. 2 normally is deenergized; a two-winding relay WRSR is utilized as a transfer relay for transferring the line circuit from the office station source to the field station source; and repeater relay WPRR of relay WPR in Fig. 1 has been omitted.

Referring now to Fig. 2, relays WPR and LSR of Fig. 2 are controlled in a manner substantially corresponding to that pointed out in detail in connection with the apparatus of Fig. 1, except that in order to correspond to the normally deenergized condition of relay WR in Fig. 2, front contacts 16 and 21 of relay WR have been omitted from the control circuits of WPR and LSR, respectively, of Fig. 2.

The apparatus of Fig. 2 is in its normal condition, as represented in the drawings, when crossover CV and lever CL1 occupy corresponding normal positions, detector sections 2T and 4T are unoccupied, and the approach locking is inactive. In this condition of the apparatus, switch indication relay WPR and locking relay LSR are energized, and indication relay WKP is energized in series with the upper winding of relay WRSR over a circuit which passes from terminal NF of battery FB through normal polar contact 5—6 of relay WPR, the upper winding and front contact 80 of relay WRSR, front contact 7 of relay WPR, control wire CW, front contact 12 and the winding of relay WKP, lever contact 13, and return wire FR to terminal CF of battery FB. Control relay WR and office relay WRP are deenergized, while indication lamp WK is dark to indicate that crossover CV and lever CL1 are in corresponding relative positions.

On moving lever CL1 to its reverse position R, the operator may control crossover CV to its corresponding reverse position. During the travel of lever CL1 from its normal N position to its reverse position R, lever contact 13 opens to open the previously traced normal indication circuit of relays WKP and WRSR, and relay WKP accordingly releases to close its back contact 36 and thus cause indication lamp WK to become illuminated to indicate that lever CL1 is out of correspondence with crossover CV. Relay WKP also opens its front contact 12 prior to contact 37 of lever CL1 closing in the reverse position of the lever; and relay WRSR also releases to open its front and close its back contact 80, thereby transferring the line circuit from the field station battery FB to the office station battery OB. Relay WR now becomes energized in series with office relay WRP over a reverse operating circuit extending from terminal NO of battery OB through contact 38 of lever CL1, the winding of relay WRP, back contact 12 of relay WKP, control wire CW, front contact 7 of relay WPR, back contact 80 of relay WRSR, contact 10 controlled by the approach locking control, front contacts 9 and 8 of relays 2TR and 4TR, respectively, the winding of relay WR and return wire OR to terminal CO of battery OB. The polarity of current energizing relay WR is now such as to cause that relay to operate its polar contact members to their reverse or right-hand position, so that crossover CV is controlled to operate to its reverse position. The reversal of the polar contact members of relay WR, of course, causes relay WPR to release, and its back contact 7 thereupon closes to provide an alternate path around back contact 80 of relay WRSR in the previously traced reverse operating circuit of relay WR.

When crossover CV reaches its reverse position, contact members 14, 15, 19 and 20 operated thereby assume their reverse positions and relay WPR becomes energized by current of reverse polarity to swing its polar contact members to their reverse positions, thereby indicating correspondence between the positions of the polar contact members of relay WR and the position of crossover CV as indicated by contact members 14, 15, 19 and 20. The energization of relay WPR also closes its front contact 7 to complete for the lower winding of relay WRSR an energizing circuit extending from terminal BF of battery FB through reverse polar contact 45—6 of relay WPR, the lower winding of relay WRSR, front contact 82 of relay WPR, and front contact 83 of relay WR to mid terminal CF of battery FB. Relay WRSR thereupon picks up to shift the line circuit from the office battery OB to the field battery FB, and the upper winding of relay WRSR becomes energized in series with indication relay WKP over a reverse indication circuit extending from terminal BF of battery FB through reverse polar contact 45—6 of relay WPR, the upper winding and front contact 80 of relay WRSR, front contact 7 of relay WPR, control wire CW, front contact 11 of relay WRP (held closed during the slow releasing period of this relay), the winding of relay WKP, contact 37 of lever CL1 and return wire FR to mid terminal CF of battery FB. The energization of relay WKP causes its front contact 12 to close and thus complete a stick circuit path in the just traced reverse indicating circuit around front contact 11 of relay WPR, which relay together with relay WR releases, since the operating circuit of relay WR is now open. Indication lamp WK also becomes dark to indicate that lever CL1 and crossover CV are in corresponding positions.

The manner in which the apparatus of Fig. 2 functions, upon movement of lever CL1 from its reverse to its normal position, to restore crossover CV to its normal position, is believed to be readily apparent from an inspection of Fig. 2 and the foregoing description of the operation of the apparatus upon movement of lever CL1 from its normal position N to its reverse position R, and further detailed explanation of the manner of restoring crossover CV to its normal position is believed to be unnecessary.

The apparatus of Fig. 2 also incorporates "lockout" means for preventing storage of switch control in the event that lever CL1 is operated during the interval that operation of the crossover is prevented by the approach and/or detector locking due to the fact that track or traffic conditions adjacent the crossover are unsafe for operation of the crossover to take place, but it is believed that a detailed explanation of the manner in which the "lockout" means of Fig. 2 functions is unnecessary in view of the detailed description of corresponding apparatus utilized in the apparatus represented in Fig. 1.

Figure 3:
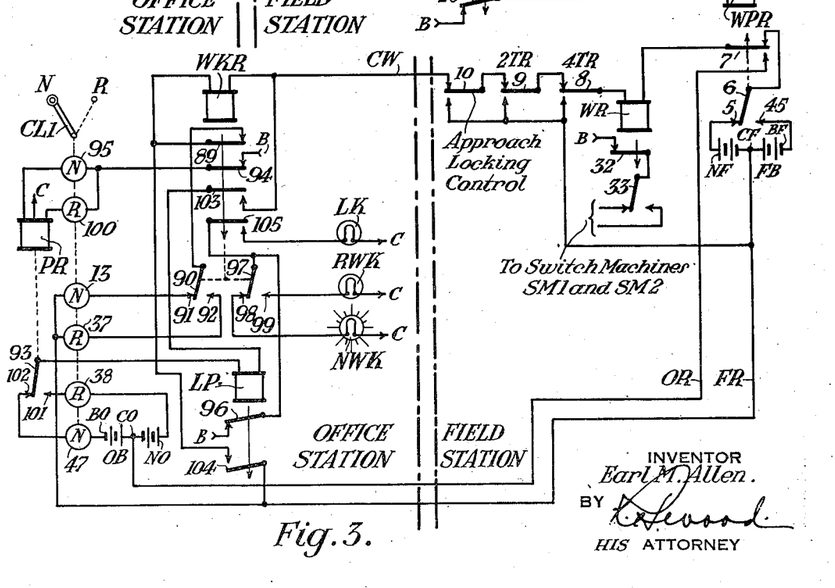

*Switch control—Fig. 3*

Another modification of the switch control apparatus illustrated in Fig. 1 is shown in Fig. 3, wherein there is represented the apparatus of Fig. 1 modified to include switch storage "lockout" means at the office station. Also included at the office station of Fig. 3 is a two-position polarized relay PR of the two-winding type effective when its one or normal winding is energized to operate an associated polar contact member 93 to its normal or left-hand position as viewed in Fig. 3, and when its other or reverse winding is energized such relay operates the polar contact member to the reverse or right-hand position. Relay PR preferably is of the type that when deenergized retains its polar armature in its last operated position. The apparatus of Fig. 3 further includes at the office station a polarized indication relay WKR, another relay LP, a normal switch indication light NWK for indicating that the controlled switch function or crossover CV is in its normal position, a reverse switch indication light RKW for indicating that crossover CV is in its reverse position, and an approach locking light LK which indicates when the approach and/or detector locking is active to prevent crossover CV from being controlled by switch control lever IL. Switch repeater relay WRP of Fig. 3 and the control thereof is not shown in the drawing since this relay is controlled by circuits substantially corresponding to those traced for such relay in connection with Fig. 1, but relay WRP of Fig. 3 preferably is provided with slow pick-up characteristics, whereas relays WR, WKR and LP of Fig. 3 preferably are provided with slow releasing characteristics.

Referring now to Fig. 3, the apparatus comprising this embodiment of my invention is represented in its normal condition such as is assumed when lever CL1 and crossover CV are in corresponding relative positions, detector track sections 2T and 4T are unoccupied, and the approach locking is inactive. In this condition of the apparatus, relay WR is energized in series with relay WKR over a normal indication circuit extending from terminal NF of battery FB through normal polar contact 5—6 and front contact 7 of relay WPR, the winding of relay WR, front contacts 8 and 9 of relays 4TR and 2TR, respectively, contact 10 operated by the approach locking control, control wire CW, the winding and front contact 89 of relay WKR, normal polar contact 90—91 of relay WKR, lever contact 13 and return wire FR to terminal CF of battery FB. The polarity of current supplied to relays WR and WKR over the just traced normal indication circuit is such that both relays operate their associated contact members to their normal positions. The normal winding of relay PR is energized and its polar contact member 93 is in its normal position due to current supplied over a circuit passing from terminal B through front contact 94 of relay WKR, lever contact 95 and the normal winding of relay PR to terminal C. Relay LP, however, is deenergized and its back contact 96 is closed to complete for normal switch indication lamp NWK a circuit which extends from terminal B through back contact 96 of relay LP, normal polar contact 97—98 of relay WKR and the filament of lamp NWK to terminal C, with the result that lamp NWK is illuminated to indicate that the controlled switch or crossover at the field station is in its normal position.

If, with the apparatus of Fig. 3 in its normal condition above described, it is desired to operate the controlled switch function at the field station to its reverse position, lever CL1 is operated to its reverse position R, thereby opening at lever contact 13 the normal indication circuit previously traced and deenergizing relays WKR and WR. When the lever reaches its reverse position, contact 100 closes to energize the reverse winding of relay PR over an obvious energizing circuit which includes front contact 94 of relay WKR, held closed during the slow release period of that relay, as well as lever contact 100. Relay PR accordingly operates its polar contact member 93 to its reverse position. At the end of their respective slow release periods, relays WKR and WR release, the latter relay in turn causing relay WPR to release, (see Fig. 1). Relay WPR opens its front and closes its back contact 7 to transfer the line circuit from the field station source to the office station source, and relays WR and LP now become energized in series over a circuit extending from terminal NO of battery OB, through lever contact 38, reverse polar contact 101—93 of relay PR, the winding of relay LP, back contact 103 of relay WKR, control wire CW, front contact 10 operated by the approach locking control, front contacts 9 and 8 of relays 2TR and 4TR, respectively, the winding of relay WR, back contact 7 of relay WPR, and return wire OR to terminal CO of battery OB. Relay LP accordingly picks up to thereby open its back contact 96 to deenergize normal indication lamp NWK, and prepares a pick-up circuit for relay WKR by closing front contact 104.

The polarity of the current supplied to relay WR over the above traced reverse operating circuit is the reverse of that supplied to such relay over the normal indication circuit, and as a result relay WR shifts its polar contact members to their right-hand or reverse positions and closes its front contact 32 to condition the operating circuits of the associated switch mechanisms to operate the controlled switch function to its reverse position. When the controlled switch function reaches its reverse position, relay WPR is energized in its reverse direction, as pointed out in detail previously in connection with the description of the operation of the apparatus of Fig. 1, and picks up to open at its back contact 7 the reverse operating circuit of relay WR. Relay LP accordingly becomes deenergized, but before it drops, relay WKR is energized in series with relay WR over a reverse indication circuit which may be traced from terminal BF of battery FB through reverse polar contact 45—6 and front contact 7 of relay WPR, the winding of relay WR, front contacts 8 and 9 of relays 4TR and 2TR, respectively, contact 10 operated by the approach locking control, control wire CW, the winding of relay WKR, front contact 104 of relay LP and return wire FR to terminal CF of battery FB. The polarity of the current applied to relays WR and WKR over the reverse indication circuit is the reverse of that supplied to such relays over the previously traced normal indication circuit, and relay WKR accordingly operates its polar contact members to their reverse positions, and picks up to close its front contact 89 and thereby complete an obvious stick circuit path, including front contact 89 and reverse polar contact 90—92 of relay WKR and lever contact 37, around front contact 104 of relay LP, which contact becomes opened when relay LP drops at the end of its slow release period. When back contact 96 of relay LP closes, reverse switch indication light RWK becomes energized over a circuit extending from terminal B through back contact 96 of relay LP, reverse polar contact 97—99 of relay WKR and the filament of the lamp RWK to terminal C. The illumination of lamp RWK indicates that the controlled switch function and the switch lever occupy corresponding reverse positions.

It is believed that from the foregoing description of the operation of the apparatus in response to a movement of switch lever CL1 from its normal to its reverse position, and from an inspection of Fig. 3, it will be readily apparent as to how such apparatus responds to a movement of the lever from its reverse to its normal position to effect the restoration of the controlled switch function to its normal position, and further detailed description of such latter operation of the apparatus accordingly is deemed unnecessary.

In the event that the apparatus of Fig. 3 is in its represented normal condition, and the approach and/or detector locking becomes active so that back contact 8, 9 or 10 closes, relay WR is held energized over an obvious circuit including the closed one of the above-mentioned back contacts of the approach and detector locking, the winding of relay WR, front contact 7 and normal polar contact 5—6 of relay WPR and field station battery FB. However, relay WKR which is normally energized in series with relay WR over the normally closed normal indication circuit, is deenergized and releases to close its back contact 105 and thereby energize locking lamp LK over a circuit extending from terminal B through back contacts 96 and 105 of relays LP and WKR, respectively, and the filament of lamp LK to terminal C. The illumination of lamp LK indicates that the controlled switch function is locked against operation by lever CL1, while lamp NWK remains illuminated to indicate the controlled switch function last was operated to its normal position.

If, now, the operator moves lever CL1 in an attempt to operate the controlled switch function at the field station, the normal contacts of the lever are opened and the reversed contacts closed, but the operation of the lever has no further effect upon the apparatus at this time, since with front contact 94 of relay WKR open, the previously traced energizing circuit for the reverse winding of relay PR also is opened and relay PR accordingly retains its polar contact member 93 in its normal position. It is thus evident that under the conditions assumed lever CL1 and relay PR are out of correspondence so that when the approach and/or detector locking again becomes inactive to open the closed one of the back contacts 8, 9 or 10, relay WR is deenergized and releases to in turn release relay WPR, and the apparatus of Fig. 3 accordingly does not cause the controlled switch function to operate to its position of correspondence with lever CL1 after the approach locking becomes inactive.

The operator may regain control of the controlled switch function by restoring lever CL1 to its position of correspondence with the switch function. The position of the switch function is, of course, indicated by the illumination of the normal indication lamp NWK at the office station, hence the operator may restore lever CL1 to its normal position and by so doing complete a normal operating circuit extending from terminal BO of battery OB through lever contact 47, normal polar contact 102—93 of relay PR, the winding of relay LP, back contact 103 of relay WKR, control wire CW, front contact 10 operated by the switch locking control, front contacts 9 and 8 of relays 2TR and 4TR, respectively, the winding of relay WR, back contact 7 of relay WPR and return wire OR to terminal CO of battery OB. Relay WR picks up in response to its energization and in turn causes relay WPR to pick up to open its back and close front contact 7, thereby transferring relay WR from the office station battery OB to the field station battery FB. Relay WR becomes energized when front contact 7 of relay WPR closes, in series with relay WKR over a circuit extending from terminal NF of battery FB through normal polar contact 5—6 and front contact 7 of relay WPR, the winding of relay WR, front contacts 8 and 9 of relays 4TR and 2TR, respectively, control wire CW, the winding of relay WKR, front contact 104 of relay LP (held closed during the slow release interval of relay LP) and return wire FR to terminal CF of battery FB. When relay WKR picks up and closes its front contact 89, it completes a stick circuit path including that front contact, normal polar contact 90—91 of relay WKP and lever contact 13, which circuit path is in multiple with front contact 104 of relay LP and becomes effective to hold relays WKR and WR energized over the previously traced normal indication circuit after front contact 104 of relay LP releases. The picking up of relay WKR also opens its back contact 105 so that when relay LP releases to close its back contact 96, normal switch indication lamp NWK becomes illuminated but locking indication lamp LK remains dark.

It is evident from the foregoing that apparatus embodying my invention provides means for controlling a function at a remote point over a line circuit extending between a control station and a remote point and including a control wire supplied with energy from a source at the office control point, and which apparatus indicates the function at the control point over a line circuit which includes the same control wire and is supplied with current from a source at the remote field point. The line circuit utilizes two return wires, one for the office station source and one for the field station source, which return wires may be employed as the common return for all of the functions controlled at the field station, thereby enabling a plurality of dissimilar functions at the remote point to be controlled by circuits which require only the two return wires, common to all of the functions, and one control wire for each function controlled. In this manner, that is, by utilizing the control wire of the function to transmit both the control and indications of a function, each function may be controlled and indicated independently of all other functions, hence if there is an unbalanced number of dissimilar functions controlled at the remote station, there arises no necessity of providing individual line wires one for each of the functions in excess of those associated with a dissimilar function, and utilized solely to transmit indications relating to such excess functions.

It is also apparent from the foregoing that apparatus embodying my invention utilizes control and indication circuits arranged on the closed circuit principle and effective to indicate any movement of a function effected by means other than by its associated operating means, and wherein the polarity of energization of the indication circuit is utilized to selectively indicate the associated function. In addition, the circuits and apparatus are arranged so that a normally energized control relay of function is maintained energized when the operation of the function is prevented by locking means; and indications may be provided to indicate at the control station that the locking means is active in preventing operation of the functions at the field station; and improved means is provided for insuring against storage of control of a function should an attempt be made to control the function during the interval that operation of the function is prevented by the locking means.

Although I have herein shown and described only three forms of remote control apparatus embodying my invention, it is understood that various changes and modifications may be made therein within the scope of the appended claims without departing from the spirit and scope of my invention.

Having thus described my invention, what I claim is:

1. In a remote control system, in combination, an office station, a field station having a plurality of controlled functions, line wires extending between said stations and including a plurality of control wires one for each controlled function and two common wires, means for controlling each of said controlled functions over a circuit including one of said common wires and the associated control wire, and means for indicating each of said controlled functions at said office station over a circuit including the other of said common wires and the associated control wire.

2. In a remote control system, in combination, an office station and a field station, a plurality of controlled functions at said field station, a plurality of indication devices at said office station one for each of said plurality of controlled functions, line wires extending between said stations and including a plurality of control wires one for each controlled function and two common wires, means for controlling each of said controlled functions over a circuit including one of said common wires and the associated control wire, and means for controlling each of said indication devices by its associated controlled function over a circuit including the other of said common wires and the control wire of the associated controlled function.

3. In a remote control system, in combination, an office station and a field station, a plurality of control devices at said office station one for each of a plurality of controlled functions at said field station, a plurality of control relays at said field station one for each of said controlled functions, a plurality of indication relays at said office station one for each of said controlled functions, a plurality of line wires extending between said stations and including a control wire for each of said controlled functions and two common wires, means controlled by each control device for energizing the associated control relay over a circuit including one of said common wires and the associated control wire, and means controlled by each controlled function for energizing the associated indication relay over a circuit including the other of said common wires and the associated control wire.

4. In a remote control system, in combination, an office station having a source of current, a field station having another source of current and a plurality of controlled functions, a plurality of control wires one for each of said controlled functions and two common wires one for each of said sources of current extending between said stations, means for controlling each of said controlled functions over a circuit including the associated control wire and the office station source of current and its associated common wire, and means for indicating each of said controlled devices at said office station over a circuit including the associated control wire and the field station source of current and its associated common wire.

5. In combination, a control device and a remote control relay for controlling a function, a first source of current at said device and a second source of current at said relay, a control wire and two common wires one for each source extending between said device and said relay, means operative in response to a movement of said control device for controlling said relay to a position of correspondence over a circuit including said control wire and said first source and its associated common wire, and means operative in response to a movement of said function to a position of correspondence with said device for indicating at said device the position of said function over a circuit including said control wire and said second source and its associated common wire.

6. In combination, a control device and a remote control relay for controlling a function, a transfer relay controlled by said device and control relay and function, a first source of current at said device and a second source of current at said control relay, a control wire and two common wires one for each source extending between said control device and said control relay, means controlled by said transfer relay in response to a movement of said control device for operating said control relay to a position of correspondence with said device over a circuit including said control wire and said first source and its associated common wire, and other means controlled by said transfer relay in response to correspondence of said control device and function for indicating such correspondence at said device over a circuit including said control wire and said second source and its associated common wire.

7. In combination, a stretch of railway track including a track switch, a control relay for said switch, signals for controlling traffic over said switch, a control relay for said signals, an office station including a control lever for said switch and a control lever for said signals, two control wires extending from said office station one to said switch control relay and the other to said signal control relay, two common wires extending from said office station to the location of said switch and signals, a control circuit for said switch control relay including said one control wire and one of said common wires and governed by said switch control lever, an indication circuit for indicating said switch at said switch lever and including said one control wire and the other of said common wires, a control circuit for said signal control relay including said other of said control wires and said one common wire and governed by said signal control lever, and an indication circuit for indicating said signals at said signal lever and including said other control wire and said other of said common wires.

8. In combination, a stretch of railway track including a track switch and provided with signals governing traffic over said switch, a field station including two control relays one for said switch and the other for said signals, an office station including two control devices one for said switch and the other for said signals, two control wires extending between said office and field stations one for said switch control relay and the other for said signal control relay, two common return wires extending between said office and field stations, a control circuit for said switch control relay including said one control wire and one of said common wires and governed by said switch control device, an indication circuit governed by said switch for indicating said switch at said office station and including said one control wire and the other of said common wires, a control circuit for said signal control relay including said other control wire and said one common wire and governed by said signal control device, and an indication circuit governed by said signals for indicating said signals at said office station and including said other control wire and said other common wire.

9. In combination, a stretch of railway track including a track switch, a control relay at said switch, a remote control station having a control device, a control wire extending from said control station to said control relay, two sources of current one at said control station and the other at said control relay, two common return wires one for each of said sources and extending from said control station to said control relay, means governed by said control device for establishing a circuit including said control wire and the control station source and its associated common return wire for controlling said control relay to a position of correspondence with said control device, means controlled by said control relay for operating said switch to a position of correspondence with said relay, and means governed by said switch for establishing an indication circuit for indicating said switch at said control station and including said control wire and the source at said relay and its associated common return wire.

10. In a remote control system, in combination, an office station provided with a plurality of control devices each capable of assuming different positions, a field station provided with a plurality of controlled functions one for each control device and each capable of assuming a position of correspondence with its associated control device, locking means responsive to conditions at said field station and effective when active to prevent operation of said controlled functions, a plurality of line wires extending between said stations and including a control wire for each controlled function and two common wires, means governed by each controlled function and normally effective for indicating at said office station correspondence between such function and its associated control device over a circuit including the associated control wire and one of said common wires, means governed by each control device and effective when said locking means is inactive for controlling the associated controlled function to a position of correspondence with such device over a circuit including the associated control wire and the other of said common wires, and means effective upon operation of a control device when said locking means is active for preventing subsequent control of the associated controlled function after said locking means becomes inactive unless said control device is first restored to it is position of correspondence with said associated controlled function.

11. In a remote control system, in combination, an office station provided with a plurality of control devices each capable of assuming different positions, a source of current at said office station, a field station provided with a plurality of controlled functions one for each control device and each capable of assuming a position of correspondence with its associated control device, a source of current at said field station, locking means responsive to conditions at said field station and effective when active to prevent operation of said controlled functions, a plurality of line wires extending between said stations and including a control wire for each controlled function and two common wires one for each of said sources of current, means governed by each controlled function and normally effective for indicating at said office station correspondence between such function and its associated control device over a circuit including the associated control wire and said field station source and its associated one of said common wires, means governed by each control device and effective when said locking means is inactive for controlling the associated controlled function to a position of correspondence with such device over a circuit including the associated control wire and said office station source and its associated one of said common wires, and means effective upon operation of a control device when said locking means is active for preventing subsequent control of the associated controlled function after said locking means becomes inactive unless said control device is first restored to its position of correspondence with said associated controlled function.

12. In a remote control system having a field station and an office station each provided with a source of current for controlling a controlled device at the field station to a position of correspondence with a multi-position control lever at the office station and also having an indicating device at the office station for indicating correspondence between the control lever and the controlled device, a line circuit extending between said stations and comprising a control wire and two return wires one for each of said sources, two office relays at said office station one for controlling said indicating device, a control relay at said field station for selectively operating said controlled device in accordance with the polarity of current supplied from said office station source to said line circuit, a transfer relay at said field station; circuit means rendered effective when said controlled device is in correspondence with said control lever for conditioning said transfer relay to pick up and complete a circuit including in series the winding of said indication relay, said control wire, the source at the field station and its associated return wire and a front contact controlled by the other office station relay whereby said indication relay picks up to complete a stick circuit path in said circuit around the front contact controlled by said other office station relay; means rendered effective upon movement of said lever to a position out of correspondence with the controlled device for opening said circuit means whereby to cause said transfer relay to release and complete a circuit including the winding of said other office station relay, the winding of said control relay, said control wire, the source at the office station and its associated return wire, a contact of said control lever, and a back contact of said indication relay and which circuit is effective to supply current of one relative polarity or the other to said control relay according as said control lever is in one or another of its positions.

13. In a remote control system having a field station and an office station each provided with a source of current for controlling a controlled device at the field station to a position of correspondence with a mutiposition control lever at the office station and also having an indicating device at the office station for indicating correspondence between the control lever and the controlled device, a line circuit extending between said stations and comprising a control wire and two return wires one for each of said sources, two office relays at said office station one for controlling said indicating device, a control relay at said field station for selectively operating said controlled device in accordance with the polarity of current supplied from said office station source to said line circuit, a transfer relay at said field station, circuit means rendered effective when said control lever and said controlled device are in corresponding relative positions for conditioning said transfer relay to be energized, and means controlled by said transfer relay when picked up for conditioning said control relay and said indication office relay to be energized over a circuit including said control wire and the return wire of said field station source and supplied with energy from the field station source and effective when said transfer relay is released for energizing said control relay in series with the other office relay over a circuit including said control wire and the other return wire and supplied with energy from the office station source.

14. In a remote control system having a field station and an office station each provided with a source of current for controlling a controlled device at the field station to a position for correspondence with a multiposition control lever at the office station and also having an indicating device at the office station for indicating correspondence between the control lever and the controlled device, a line circuit extending between said stations and comprising a control wire and two return wires one for each of said sources, two office relays at said office station one for controlling said indicating device, a control relay at said field station for selectively operating said controlled device in accordance with the polarity of current supplied from said office station source to said line circuit, a transfer relay at said field station, circuit means rendered effective when said control lever and said controlled device are in corresponding relative positions for conditioning said transfer relay to be energized and for conditioning said indication office relay to be interposed in a circuit including said control wire and the return wire of the field station source and supplied with energy from said field station source, and means controlled by said transfer relay and effective when said relay is released for interposing said control relay in series with the other office station relay in a circuit including said control wire and the other of said return wires and supplied with energy from said office station source of one relative polarity or the other in accordance with the position of said control lever.

15. In a remote control system, a field station and an office station, two sources of current one at said office station and the other at said field station, a control lever at said office station, a line circuit extending between said stations and comprising a control wire and two return wires one for each of said sources, a control relay at said field station for governing said controlled device in accordance with the polarity of energization of said relay and an indication relay at said office station for governing said indicating device, means governed by said control lever for energizing said control relay with current of one relative polarity or the other supplied from said office station source over a circuit comprising said control wire and the return wire of said office station source, transfer means, means responsive to the position of said controlled device for conditioning said transfer means to be energized when said control lever and said controlled device are in corresponding relative positions, and means governed by said transfer relay and effective when said relay is picked up for energizing said indication office relay by current supplied from said field station source to a circuit including the associated return wire and said control wire.

16. In a remote control system, a field station and an office station, a controlled function at said field station and an indication device at said office station, two sources of current one at said office station and the other at said field station, a line circuit extending between said stations and comprising a control wire and two return wires one for each source, a polarized control relay at said field station for controlling said controlled function in accordance with the polarity of energization of said relay, an indication relay at said office station for controlling said indication device, a transfer relay at said field station, a control lever at said office station, circuit means responsive to the positions of said controlled device and said control relay and lever for energizing said transfer relay when said control relay and lever and controlled device are in corresponding relative positions, means controlled by said control lever and effective when said transfer relay is picked up for energizing said indication relay over a circuit supplied with energy from said field station source and including the associated return wire and said control wire, and means controlled by said transfer relay when released upon movement of said control lever for energizing said control relay over a circuit supplied with energy from said office station source and including the associated return wire and said control wire.

17. In a remote control system, an office station including a manually operable control member, a field station including a controlled function operable to positions of correspondence with said control member and a control relay for controlling the operation of said function, a two-winding relay at said field station, two sources of current one at each station, line wires extending between said stations and including a control wire and two return wires one for each source; means controlled by said function when in correspondence with said member for normally energizing said two-winding relay over a circuit including one winding and a front contact of said two-winding relay, a contact of said member, said control wire, the office station source, and its associated return wire; means for energizing said control relay over a circuit including a back contact of said two-winding relay, said control wire, a contact of said member, the field station source and its associated return wire; and a circuit effective to pick up said two-winding relay when said function operates to a position of correspondence with said member and including the other winding of said two-winding relay, a front contact of said control relay, a contact closed only when said control relay and said function are in corresponding relative positions, and said field station source.

18. In a remote control system, in combination, an office station including a manually operable control member and an indication relay, a field station including a controlled function operable to positions of correspondence with said member and a normally deenergized control relay for controlling the operation of said function, another relay at said field station, two source of current one at each station, line wires extending between said stations and including two return wires one for each of said sources and a control wire; means rendered effective when said function and said member are in corresponding relative positions for normally energizing said indication relay over a circuit including a winding and a front contact of said other relay, said control wire, a contact controlled by said member, the field station source and its associated return wire; means rendered effective upon operation of said member for energizing said control relay over a circuit including a back contact of said other relay, said control wire, a contact controlled by said member, the office station source and its associated return wire; and means rendered effective when said function and control relay are in corresponding relative positions for picking up said other relay over a circuit including a winding of said other relay, a front contact of said control relay and a contact closed only when said function and control relay are in corresponding relative positions.

19. In combination, a stretch of railway track including a track switch, a polarized control relay for controlling said switch, means responsive to traffic adjacent said switch and active when conditions are unfavorable for operation of said switch, another relay, a two-position relay of the type which remains in its last operated position when deenergized, a manually controllable member having a first and second position for reversibly operating said two-position relay into a position of correspondence with the member over a circuit including a front contact of said other relay, a circuit controlled by said switch for energizing said other relay when said traffic responsive means are inactive and said switch and member occupy corresponding relative positions, and a circuit including a contact of said two-position relay for reversibly energizing said control relay.

20. In combination, a stretch of railway track including a track switch, a polarized control relay for controlling the operation of said switch, means responsive to traffic on said stretch adjacent said switch and active when conditions are unfavorable for operation of said switch, a polarized indication relay, a two-position relay of the type which remains in its last operated position when deenergized, a manually controllable member for reversibly energizing said two-position relay into a position of correspondence with said member over a circuit including a front contact of said indication relay, a circuit controlled by said switch for energizing said indication relay by current of one relative polarity or the other according as said switch and member accupy one or another corresponding relative position when said traffic responsive means are inactive, and a circuit controlled by a contact of said two-position relay for energizing said control relay by current of one relative polarity or the other.

EARL M. ALLEN.